United States Patent [19]
Garrison

[11] 3,905,207
[45] Sept. 16, 1975

[54] FLEXIBLE COUPLING
[76] Inventor: Ward S. Garrison, 1819 E. Spruce, Olathe, Kans. 66061
[22] Filed: May 13, 1974
[21] Appl. No.: 469,236

[52] U.S. Cl. .................. 64/10; 64/11; 64/27 NM
[51] Int. Cl. ............................................ F16d 3/48
[58] Field of Search ............ 64/10, 11 R, 13, 27 R, 64/27 NM, 6

[56] References Cited
UNITED STATES PATENTS

| | | | |
|---|---|---|---|
| 1,820,750 | 8/1931 | Lord | 64/27 NM |
| 2,439,479 | 4/1948 | Mackmann | 64/10 |
| 2,477,447 | 7/1919 | Famick | 64/11 R |
| 3,487,425 | 12/1969 | Berhan | 64/11 R |

FOREIGN PATENTS OR APPLICATIONS

| 1,061,279 | 3/1967 | United Kingdom | 64/13 |
|---|---|---|---|

Primary Examiner—Samuel Scott
Assistant Examiner—Randall Heald
Attorney, Agent, or Firm—Fishburn, Gold & Litman

[57] ABSTRACT

A flexible coupling for transmitting torque from a first shaft to a second shaft and for accommodating misalignment in all directions including angular, axial and offset misalignment of the shafts includes a plurality of spaced torque transmitting members each received in and retained in a respective pair of substantially axially aligned apertures in first and second hub members which are positioned in facing relation and connectable to the first shaft and to the second shaft respectively for rotation therewith. Each aperture of each pair of axially aligned apertures has a first counterbore and a second counterbore terminating at outwardly facing surfaces defining shoulders engaged by first and second bushings respectively with each bushing having a bore enlarging outwardly from the respective shoulder to thereby permit flexing of the torque transmitting members about respective fulcrums defined by certain size bores in each of the apertures during transmitting torque or rotation from the first shaft to the second shaft and accommodating misalignment in all directions.

7 Claims, 3 Drawing Figures

PATENTED SEP 16 1975　　　　　　　　　　　　　　3,905,207
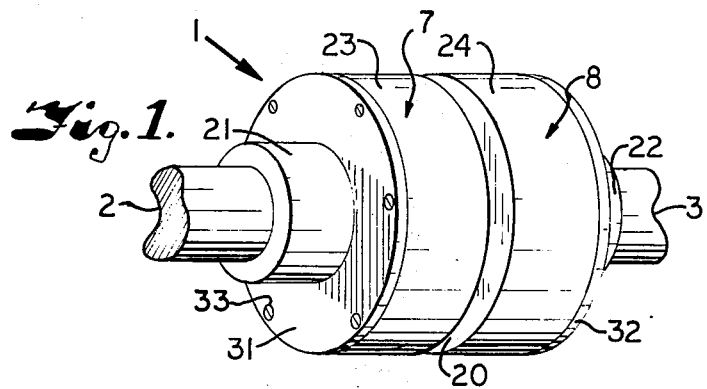
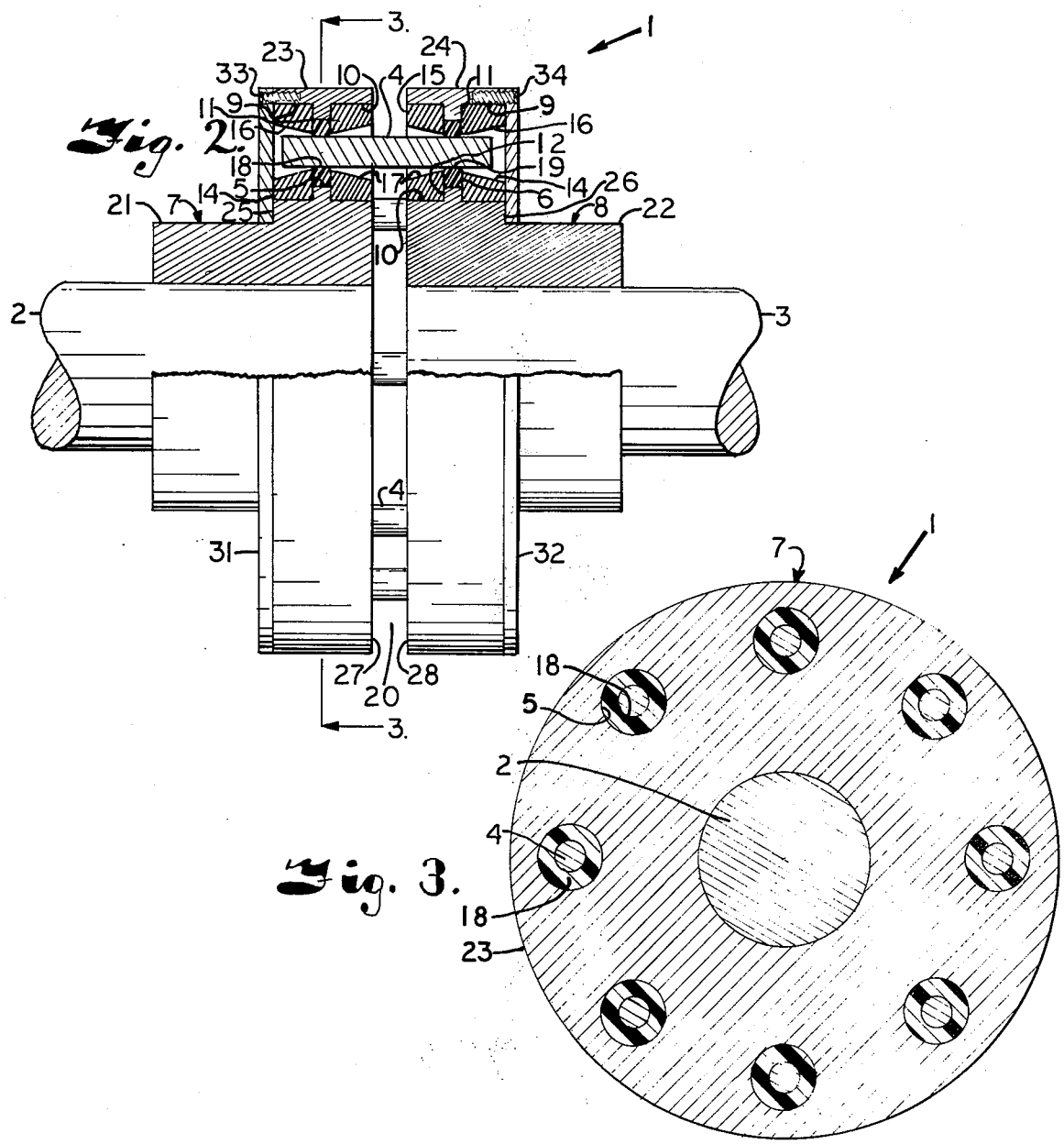

FLEXIBLE COUPLING

The present invention relates to a flexible coupling for connecting adjacent ends of two substantially axially aligned shafts and more particularly to such a flexible coupling adapted to absorb torsional shock by deflecting or flexing of torque transmitting members mounted in and extending between facing hub members when transmitting torque from one shaft to another shaft and when accommodating misalignment in all directions.

The principal objects of the present invention are: to provide a flexible coupling particularly adapted to transmit torque or rotation between substantially axially aligned shafts and to accommodate misalignment in all directions including axial, angular and offset misalignment; to provide such a flexible coupling adapted to absorb torsional shock by flexing of torque transmitting members mounted in and extending between facing surfaces of hub or coupling members mounted on and connected to respective substantially axially aligned shafts; to provide such a flexible coupling having torque transmitting members which are each free for lateral and linear movement in bushings and wear members; to provide such a flexible coupling wherein the torque transmitting members are formed of spring steel whereby the flexible coupling is capable of absorbing impact energies and dampening vibration caused thereby; to provide such a flexible coupling employing the predictable resilience of spring steel torque transmitting members for torsional flexibility; to provide such a flexible coupling characterized by the absence of connecting members fixed to and extending between the hub members mounted on substantially axially aligned and spaced shafts; and to provide such a flexible coupling which is economical to manufacture, easy to assemble, durable in construction, positive in operation, and particularly well adapted for the proposed use.

Other objects and advantages of this invention will become apparent from the following description taken in connection with the accompanying drawings wherein are set forth, by way of illustration and example, certain embodiments of this invention.

The drawings constitute a part of the specification and include an exemplary embodiment of the present invention and illustrate various objects and features of the flexible coupling.

FIG. 1 is a perspective view of a flexible coupling embodying features of the present invention.

FIG. 2 is a side elevational view of the flexible coupling with portions broken away to illustrate the component parts therein.

FIG. 3 is a transverse sectional view taken on line 3—3, FIG. 2.

Referring more in detail to the drawings:

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously emply the present invention in virtually any appropriately detailed structure.

In the disclosed embodiment of the present invention, the reference numeral 1 generally designates a flexible coupling for transmitting torque or rotation from a first shaft 2 to a second shaft 3 and for accommodating misalignment in all directions including angular, axial and offset misalignment of the shafts 2 and 3. The flexible coupling 1 includes a plurality of spaced torque transmitting members 4 each received in and retained in a respective pair of substantially axially aligned apertures 5 and 6 in a first hub member 7 and a second hub member 8 respectively and which are positioned in facing relation and connectable to the first shaft 2 and to the second shaft 3 respectively for rotation therewith. The apertures 5 and 6 of each pair of axially aligned apertures each have a first counterbore 9 and a second counterbore 10 terminating at surfaces defining outwardly facing shoulders 11 and 12 which are engaged by first and second bushings 14 and 15 respectively. The first and second bushings 14 and 15 have bores 16 and 17 respectively enlarging outwardly from the respective shoulders 11 and 12 to thereby permit flexing of the torque transmitting members 4 about respective fulcrums 18 and 19 defined by certain size bores in the apertures 5 and 6 during transmitting of torque or rotation from the first shaft 2 to the second shaft 3 and accommodating misalignment in all directions.

The flexible coupling 1 is adapted for use in any structure where it is desired to transmit torque or rotation from one shaft to another and to avoid shock to the driven shaft. The shafts 2 and 3 are positioned in substantially coaxial alignment and with an axial gap 20 between facing ends of the shafts 2 and 3. The first shaft 2 and the second shaft 3 may be any suitable shape, such as round or square, as desired.

The hub members 7 and 8 are connectable to the first shaft 2 and the second shaft 3 respectively in any suitable manner. In the illustrated structure, the hub members 7 and 8 have tubular hub portions 21 and 22 respectively receiving the shafts 2 and 3 and suitably connected thereto, as by suitable keys and keyways.

The illustrated hub members 7 and 8 have end flanges 23 and 24 respectively which are positioned in facing relation and extend outwardly from the hub portions 21 and 22 repectively. The end flanges 23 and 24 have first or outwardly facing surfaces or faces 25 and 26 respectively and second or inwardly facing surfaces or faces 27 and 28 respectively. The second faces 27 and 28 are in facing relation and cooperate to define the axial gap 20.

The apertures 5 and 6 in the end flanges 23 and 24 respectively are arranged so that the apertures 5 and 6 each have a respective axis which is substantially parallel with the axis of the respective shafts 2 and 3. The apertures 5 and 6 in the end flanges 23 and 24 respectively are arranged in substantial axial alignment to define axially aligned pairs. In the illustrated structure, the apertures 5 and 6 are arranged in circumferentially spaced relation around the longitudinal axis of the first and second shafts respectively.

In the illustrated embodiment, the first counterbores 9 for each of the apertures 5 and 6 extend inwardly from the respective first face 25 and 26 of the end flanges 23 and 24 and the second counterbores 12 extend inwardly from the respective second face 27 and 28 of the end flanges 23 and 24. The first and second counterbores 9 and 10 terminate at outwardly facing surfaces defining the shoulders 11 and 12 respectively.

The flexible coupling 1 includes means in each of the axially aligned apertures 5 and 6 and in engagement with the respective torque transmitting member 4 therein to permit flexing of the torque transmitting member 4 upon rotation of one of the first shaft 2 and the second shaft 3 to transmit rotation to the other of the first shaft 2 and the second shaft 3. In the illustrated structure, the first bushings 14 are each mounted in a respective first counterbore 9 and have one end thereof engaging the shoulder 11. The second bushings 15 are each mounted in a respective second counterbore 10 and have one end thereof in engagement with the shoulder 12. The outer face of the first and second bushings 14 and 15 are preferably substantially coplanar with a respective face of the respective end flange, for a purpose later described.

The bores 16 and 17 in the bushings 14 and 15 are outwardly tappering and have surfaces tapering outwardly from the axis of the respective aperture and in opposite directions so as to have the largest opening adjacent the respective face or surface of the respective end flange and to have the smallest opening of the bores 16 and 17 of the bushings 14 and 15 respectively in engagement with an exterior surface of the respective torque transmitting member 4 received therein.

The fulcrums 18 and 19 about which the torque transmitting members 4 flex or deflect comprise a plurality of wear members or fulcrums 18 and 19 mounted in the apertures 5 and 6 respectively and having an interior surface thereof engaging an exterior surface of a respective torque transmitting member 4. The wear members or fulcrums 18 and 19 are each positioned with an exterior surface thereof in engagement with a surface defining the apertures 5 and 6 respectively. The wear members or fulcrums are also positioned with opposite ends thereof positioned between and in engagement with the faces or ends of the bushings 14 and 15 which are in engagement with the shoulders 11 and 12.

The flexible coupling 1 includes means mounted on the end flanges 23 and 24 and positioned adjacent and spaced from opposite ends of the torque transmitting members 4 to retain same in the respective axially aligned apertures 5 and 6. In the illustrated structure, a first cover plate 31 is mounted on the first face 25 of the first end flange 23 and a second cover plate 32 mounted on the first face 26 of the second end flange 24. The cover plates 31 and 32 are operative to close the apertures 5 and 6 and to retain the torque transmitting members 4 therein. The first and second cover plates 31 and 32 are spaced from respective opposite ends of the torque transmitting members 4 and in engagement with the respective bushings 14. The cover plates 31 and 32 may be mounted on the first faces 25 and 26 respectively in any suitable manner, such as by screws 33 and 34 respectively.

The assembly of a flexible coupling constructed as illustrated and described is fast and simple. The hub members 7 and 8 are mounted on the shafts 2 and 3 and suitably connected thereto, as by keys. The hub members 7 and 8 are adjusted in position to define the axial gap 20. The wear members are mounted in the apertures 5 and 6 to define the fulcrums 18 and 19 and are positioned with respective opposite ends thereof substantially aligned with the shoulders 11 and 12 respectively. The first bushings 14 are mounted in the first counterbores 9 and the second bushings 15 are mounted in the second counterbores 10. The torque transmitting members 4 are placed in the apertures 5 and 6 with the opposite ends thereof spaced from the respective first faces 25 and 26, preferably a like distance. The cover plates 31 and 32 are mounted on the first faces 25 and 26 respectively of the end flanges 23 and 24, as by the screws 33 and 34.

The assembled flexible coupling 1 is particularly adapted to accommodate misalignment in all directions including offset misalignment, such as when the shafts 2 and 3 are substantially parallel with the longitudinal axis thereof spaced apart and angular misalignment, such as when the longitudinal axis of the first and second shafts 2 and 3 intersect at a position within the axial gap 20. The torque transmitting members 4 accommodate such misalignment by deflecting, flexing or bending about the fulcrums 18 and 19 and by lateral and linear movement. Shock or impact loads are also accommodated by the flexible coupling 1 by the resilience of the torque transmitting members 4 which are preferably formed of a material having a predictable resilience, such as spring steel of a long wearing alloy, such as chrome-vanadium.

The wear members or fulcrums 18 and 19 are each preferably formed of a material having some resiliency and which is durable and long wearing, such as plastic or hard rubber. The fulcrums 18 and 19 are each in contact with the torque transmitting members 4 and have rounded surfaces to permit easy movement of the torque transmitting members 4 about the fulcrums 18 and 19.

The bushings 14 and 15 each enlarge outwardly from the respective fulcrum at substantially equal angles relative to the axis of the respective apertures 5 and 6 and counterbores 9 and 10 whereby the surface defining the bore 16 of each bushing 14 is substantially parallel with an opposite surface defining the bore 17 of the adjacent bushing 15 and thereby permit the portion of the respective torque transmitting member 4 in engagement with the bushings 14 and 15 to be substantially straight and have one side thereof in engagement with the surface of the bore 16 and an opposite side in engagement with the opposite surface of the bore 17.

It is to be understood that while I have illustrated and described one form of my invention, it is not to be limited to the specific form or arrangement of parts herein described and shown.

What I claim and desire to secure by Letters Patent is:

1. A coupling for connecting a driving shaft and a driven shaft, said coupling comprising:

a. a first hub member and a second hub member connectable to a driving shaft and a driven shaft respectively for rotation therewith, said hub members each having respective surfaces in inwardly facing relation and respective outwardly facing surfaces, said hub members each having a plurality of apertures therein, each of said apertures in one of said hub members being substantially axially aligned with a respective one of said apertures in the other of said hub members to define axially aligned pairs;

b. wear members removably mounted in said first and second hub members and having surfaces in each of said apertures in each of said hub members defining a bore of a certain size, said certain size bores each being spaced from the respective inwardly and outwardly facing surfaces of said respective hub members;

c. surfaces in each of said apertures in each of said hub members tapering outwardly from the axis of said apertures and in opposite directions from said respective certain size bores;

d. a plurality of elongated torque transmitting members each received in a respective one of the axially aligned pairs of apertures and substantially fitting said certain size bores whereby said certain size bores form fulcrums for said torque transmitting members to accommodate misalignment in all directions and transmit torque from the driving shaft to the driven shaft, said torque transmitting members being characterized by sufficient flexibility to deflect about said certain size bores when transmitting torque from the driving shaft to the driven shaft and when accommodating misalignment between the driving shaft and the driven shaft;

e. said torque transmitting members for each aligned pair of apertures being an elongate straight member and having opposite ends;

f. means connected to said first and second hub members and having portions at each of said apertures adjacent opposite ends of said torque transmitting members to retain same and permit limited endwise movement thereof in the respective aligned pairs of apertures.

2. A coupling for connecting a driving shaft and a riven shaft, said coupling comprising:

a. a first hub member and a second hub member connectable to a driving shaft and a driven shaft respectively for rotation therewith, said hub members each having respective surfaces in facing relation and each having a plurality of apertures therein, each of said apertures in one of said hub members being substantially axially aligned with a respective one of said apertures in the other of said hub members to define axially aligned pairs;

b. surfaces in each of said apertures in each of said hub members defining a bore of a certain size, said certain size bores each being spaced from the respective surface of said respective hub members;

c. surfaces in each of said apertures in each of said hub members tapering outwardly from the axis of said apertures and in opposite directions from said respective certain size bores;

d. a plurality of elongated torque transmitting members each received in a respective one of the axially aligned pairs of apertures and substantially fitting said certain size bores whereby said certain size bores form fulcrums for said torque transmitting members to accommodate misalignment in all directions and transmit torque from the driving shaft to the driven shaft, said torque transmitting members being characterized by sufficient flexibility to deflect about certain size bores when transmitting torque from the driving shaft to the driven shaft and when accommodating misalignment between the driving shaft and the driven shaft;

e. each of said apertures in each of said hub members having a first counterbore and a second counterbore extending in opposite directions from said respective certain size bores to define respective shoulders;

f. each of said first counterbores and second counterbores having a respective bushing therein and engaging a respective shoulder; and g. each of said bushings having an outwardly tapering bore thereby defining said outwardly tapering surfaces in each of said apertures in each of said hub members.

3. A coupling as set forth in claim 2 wherein:

a. each of said apertures in each of said hub members has a respective wear member therein and positioned between and in engagement with said bushings in said respective counterbores; and b. each of said wear members has a bore therethrough and in engagement with an exterior surface of a respective one of said torque transmitting members thereby defining said certain size bores.

4. A coupling as set forth in claim 2 wherein:

a. said apertures in each of said hub members are circumferentially spaced in said respective hub members;

b. said apertures in each of said hub members each extend between opposite surfaces of each of said hub members; and c. a first cover plate is mounted on said first hub member and a second cover plate is mounted on said second hub member and positioned adjacent respective opposite ends of said respective elongated torque transmitting members to retain same in said respective axially aligned pairs of apertures.

5. A flexible coupling comprising:

a. a driving shaft and a driven shaft positioned substantially coaxial with said driving shaft;

b. a first hub member and a second hub member connectable to said driving shaft and said driven shaft respectively for rotation therewith, said hub members each having respective surfaces in facing relation and each having a plurality of circumferentially spaced apertures therein, each of said apertures in one of said hub members being substantially axially aligned with a respective one of said apertures in the other of said hub members to define axially aligned pairs, the apertures in each of said hub members having an axis substantially parallel with the axis of the respective driving shaft and driven shaft;

c. means in each of said apertures in each of said hub members defining a bore of a certain size, said certain size bores each being spaced from the respective surface of said respective hub members;

d. means in each of said apertures in each of said hub members defining surfaces tapered outwardly from the axis of said apertures and in opposite directions from said respective certain size bores;

e. a plurality of elongated torque transmitting members each received in a respective one of the axially aligned pairs of apertures and substantially fitting said certain size bores whereby said certain size bores form fulcrums for said torque transmitting members to accommodate misalignment on all directions and transmit torque from the driving shaft to the driven shaft, said torque transmitting members being characterized by sufficient flexibility to deflect about said certain size bores when transmitting torque from the driving shaft to the driven shaft and when accommodating misalignment between the driving shaft and the driven shaft;